June 21, 1966 R. I. ROTH 3,257,646
VARIABLE WORD LENGTH ASSOCIATIVE MEMORY
Filed Jan. 24, 1963 4 Sheets-Sheet 2
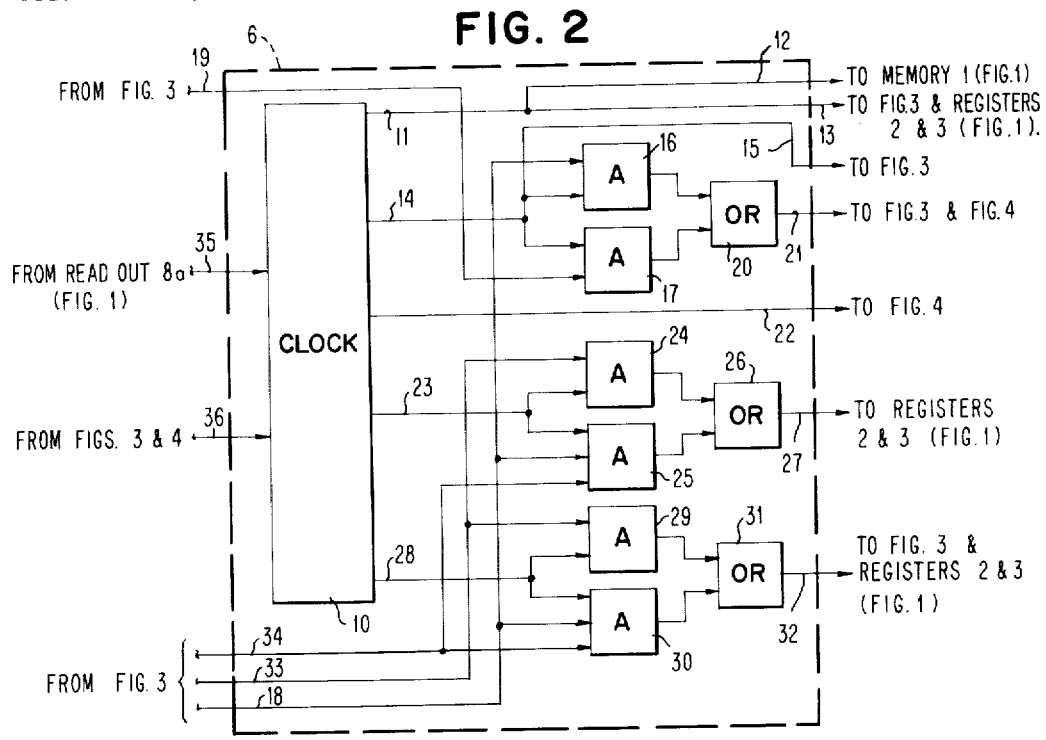
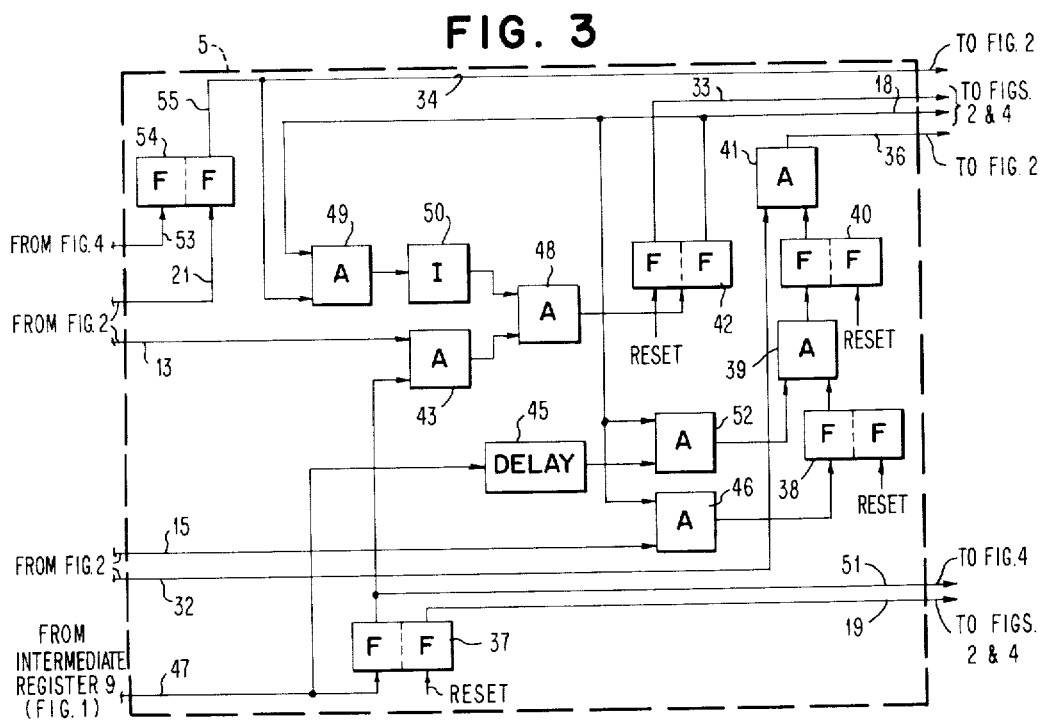

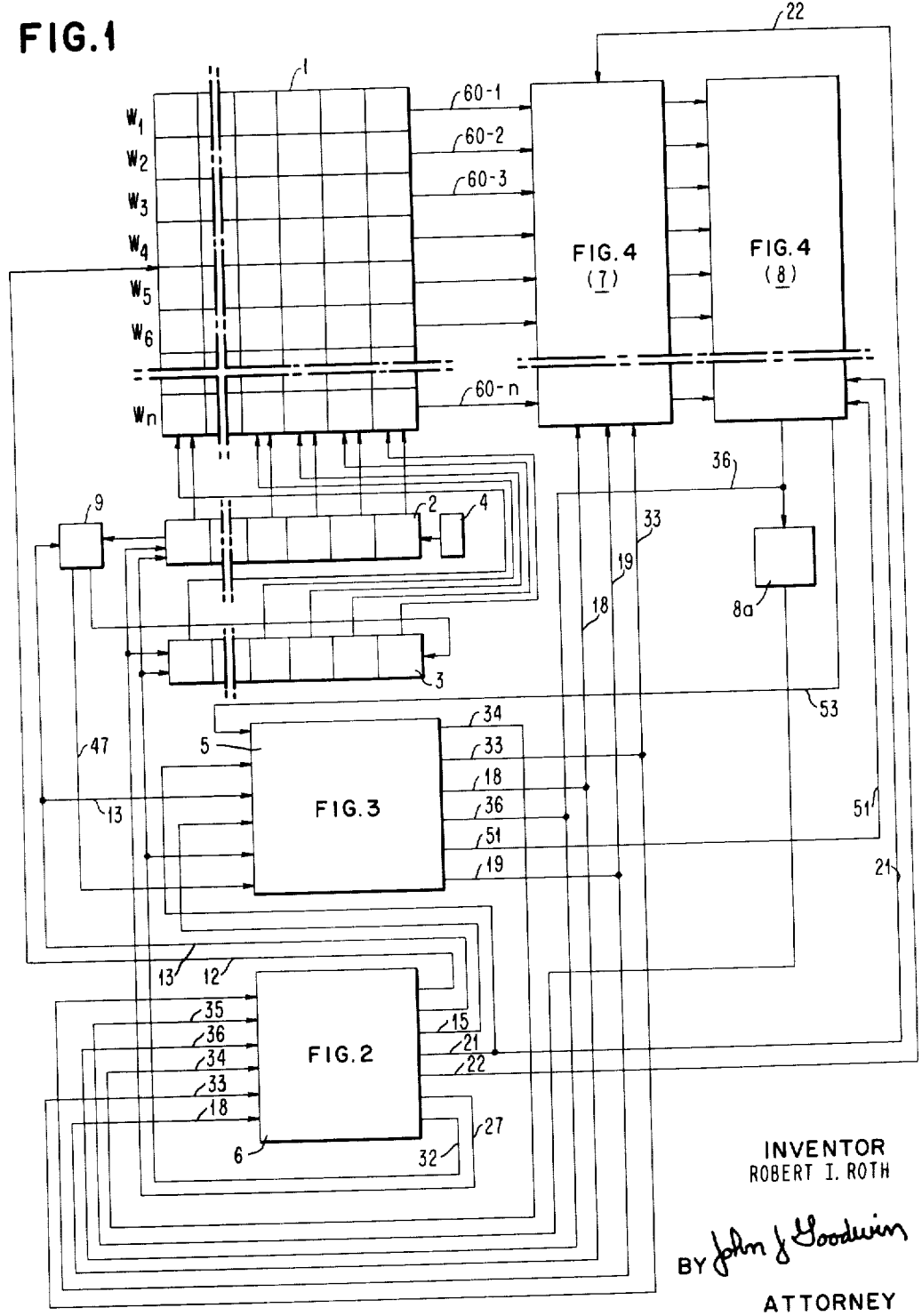

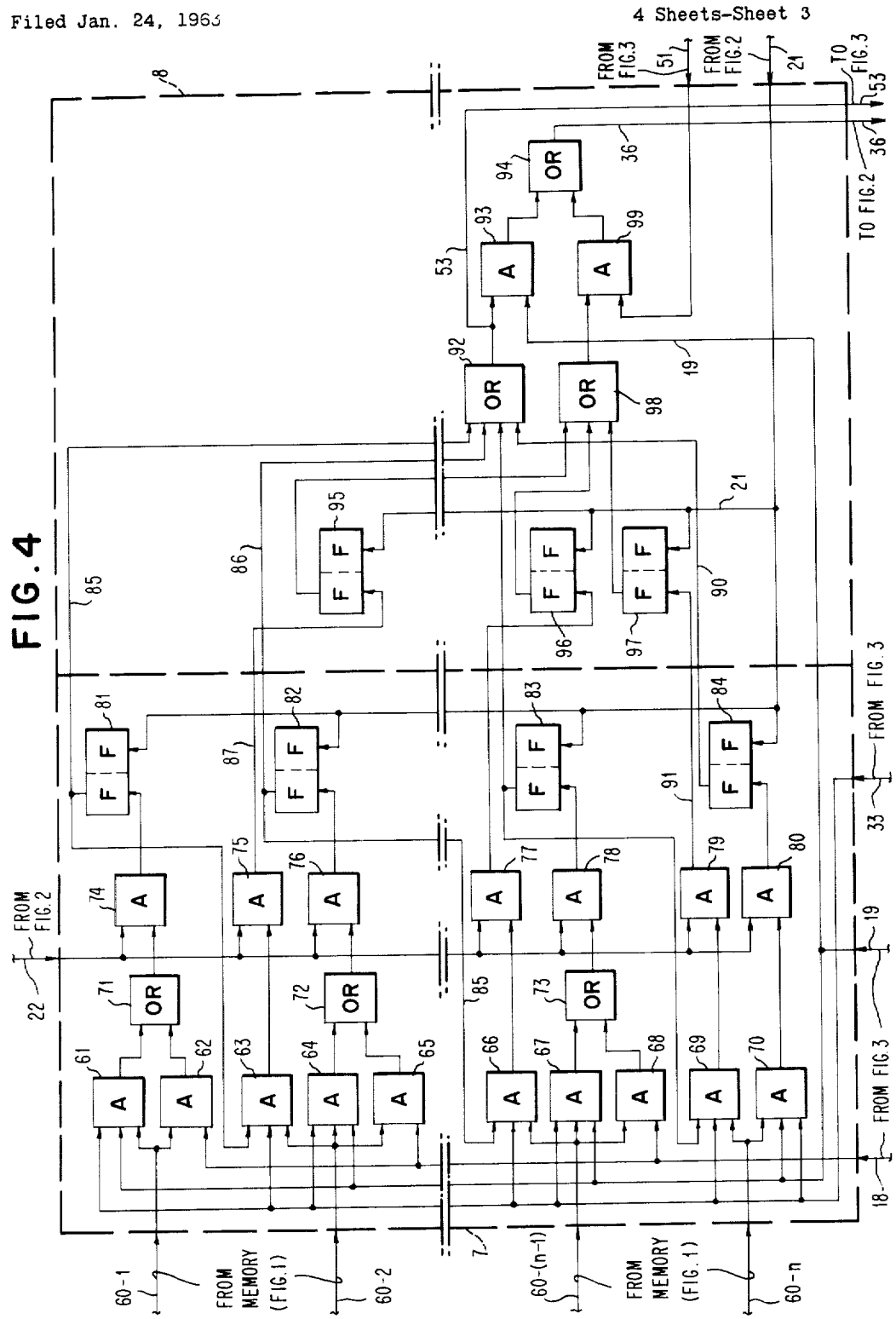

FIG. 5
FIG. 6
FIG. 7
FIG. 8
FIG. 9
FIG. 10
FIG. 11

United States Patent Office 3,257,646
Patented June 21, 1966

3,257,646
VARIABLE WORD LENGTH ASSOCIATIVE MEMORY
Robert I. Roth, Briarcliff Manor, N.Y., assignor to International Business Machines Corporation, New York, N.Y., a corporation of New York
Filed Jan. 24, 1963, Ser. No. 253,606
6 Claims. (Cl. 340—172.5)

The present invention relates to an associative memory system and more particularly to an associative memory system for variable length data words which may occupy more than one memory word position.

The usual associative memory consists essentially of a multiple word memory wherein information in the form of separate data words occupy separate rows of the memory, referred to as memory words. An association input register or argument register is also included, and means for comparing the contents of the argument register simultaneously with all the contents of the memory. In comparing the contents of the argument register with the contents of the memory, all the words in the memory are tested for the association and all such words which meet the association are selected in essentially one parallel operation.

It is very common that the data words are composed of sub-units of information defined as "fields." In a typical instance a data word relating to a particular employee may include separate fields such as the employee's name, his job title, his hourly wage rate, and his employee serial number with the characters determining the name, title, etc. being separated by unique bits denoting the boundaries of the separate fields. By introducing an employee serial number into the argument register and comparing in the memory, the entire data word for the employee can be read-out. The data words to be stored in the memory, however, may not necessarily be the same length as the memory words. In such instances it has been found more efficient to begin each data word immediately after the end of the preceding data word. When each data word begins at the character position adjacent to the end of the preceding data word rather than at the beginning of a new memory word, the memory may be fully loaded and is therefore more efficient. This is referred to as a variable word length memory. A drawback of the variable word length memory, however, is that since one or more fields may be split and appear in more than one memory word, the principles of the associative memory heretofore could not be adapted thereto.

Accordingly, an object of the present invention is to provide an associative memory system employing a variable word length memory.

Another object of the present invention is to provide an associative memory system for performing an association on a field of a data word regardless of its position in a variable length data word.

Still another object of the present invention is to provide an associative memory system for performing an association on a field of a data word occupying more than a single memory word position.

A feature of the present invention is the provision of an associative memory system for performing an association on a field of a data word occupying more than a single memory word position wherein the system includes a plurality of argument registers and control and matching circuits therefor to carry out such association.

The foregoing and other objects, features and advantages of the invention will be apparent from the following more particular description of a preferred embodiment of the invention, as illustrated in the accompanying drawings.

In the drawings:
FIG. 1 is a schematic block diagram of an embodiment of an associative memory system including a variable word length memory following the principles of the present invention.
FIG. 2 is a schematic diagram of a clock circuit employed in the system of FIG. 1.
FIG. 3 is a schematic diagram of a control circuit employed in the system of FIG. 1.
FIG. 4 is a schematic diagram of single match and consecutive match circuits employed in the system of FIG. 1.
FIGS. 5 through 11 are symbolic representations of the memory and argument registers of FIG. 1 with various word and field conditions.

Referring to FIG. 1, a schematic block diagram of a novel associative memory system is shown including a variable word length memory 1, a first argument register 2, a second argument register 3, a mask character emitter 4 for entering mask characters into argument register 2, a control circuit 5, a clock circuit 6, a single compare circuit 7, and a consecutive compare circuit 8.

Memory 1 is a conventional memory storage device of the magnetic core type, cryogenic type, or the like. Memory 1 contains a plurality of rows $W_1$ through $W_n$ capable of retaining meaningful information. Rows $W_1$ through $W_n$ are referred to as memory words. Each memory word includes a plurality of character positions, the first through last positions being designated 1 through $m$. Each character in the position is composed of six binary bits. The memory words $W_1$ through $W_n$ are fixed in length and position. The information stored in memory 1 is in the form of data words which contain one or more fields. The beginning of each data word is designated by a specialized digital character referred to herein by the symbol

The end of each data word is designated by a different digital character depicted by the symbol

The beginning and end of the fields within the data words are designated by a digital character designated by the symbol

It is understood that the three symbols shown above are, in terms of circuitry, six flip-flops conditioned in particular combinations.

In the present disclosure the data words may occupy more than one memory word and one or more fields may begin and end in separate memory words. For example, a data word may begin at position $m$ of $W_1$ and end at position 4 of $W_3$ with a field beginning in $W_1$ and ending in $W_2$. It is obvious that if a field argument were introduced into a conventional argument register for comparison with the fields stored in the memory by conducting the argument field characters in parallel up through the columns of the memory words, in the event that the matching field in the memory were split and located in more than one memory word an association would not occur.

The system of FIG. 1 includes a first argument register 2 and a second argument register 3. Argument registers 2 and 3 are shift registers capable of shifting a character one position to the left within itself upon the application of two shift pulses to be later discussed. Argument registers 2 and 3 are coupled together such that the information contained in the last, or left most character position of register 2 is shifted into the first, or right most character position of register 3 upon the next occurrence of the shift pulses. Also, register 2 has a mask character emitter 4 coupled to the first character position such that a mask character is written into the first character position upon the occurrence of the aforesaid shift pulses. Argument registers 2 and 3, being shift registers, also include the intermediate registers required for the shifting operation. The intermediate registers are not shown in FIG. 1 with the exception of the last character position of the intermediate register associated with argument register 2. The last character position of the intermediate register is symbolically shown in FIG. 1 and is designated by the reference numeral 9. Intermediate character position stage 9 is designed such that it may be interrogated to determine if a field boundary mark

is contained therein.

Prior to entering an argument, the registers 2 and 3 contain a mask character in each character positon. The argument (field) is entered into register 2 such that its right (lower order) end field boundary bit occupies the first character position. The arrangement of a representative data word in memory 1 and an argument in register 2 is symbolically shown in FIG. 5, wherein mask characters are designated by the symbol M. The depicted portions of the system of FIG. 1 are shown having the same reference designations in FIG. 5. In FIG. 5, memory 1 is shown having two stored data words, the first extending from the sixth character position of memory word $W_1$ to the sixth character position of memory word $M_3$ and the second data word extending from the fifth character position of memory word $M_3$ to the third character position of memory word $W_5$. The memory words are shown having a length of six characters for purposes of explanation, however, in practical instances the memory words are of greater length.

The argument is written into register 2 in a conventional manner with the right field boundary mark in the first character position. The character positions of registers 2 and 3 which do not contain field characters or field boundary characters contain mask characters.

Referring to FIG. 1, with the understanding that the conditions depicted in FIG. 5 are present, the cycle of clock 6 is started. Clock 6 will be more fully described, but generally it produces five pulses per cycle designated as the A, B, C, D and E pulses. When clock 6 is started, it begins with the A pulse and when receiving a stop pulse, it will run to the E pulse before stopping. If clock 6 is not stopped, it will run continuously A, B, C, D, E, $^2$A, $^2$B, $^2$C, $^2$D, $^2$E, etc.

The A pulse resets memory 1 to its match condition and interrogates the last character position 9 of the intermediate register of register 2 to determine if a field boundary mark is stored therein as a result of a previous switching. With the condition as depicted in FIG. 5 there will be no field boundary mark stored in the last character position 9 of the intermediate register.

The B pulse conditions a separate Br pulse which resets the flip-flops in a single match circuit 7 to the "not match" state so they will be in condition to be switched to indicate a match when memory 1 is interrogated.

The B pulse also causes the information contained in argument register 2 to be read into memory 1 where, in a parallel manner, it is compared column by column with the information in the memory. For example, the field boundary mark in the first character position of register 2 is compared with the information in the first character position of each of the memory words $W_1$ through $W_n$, the 2 in the second character position is compared with the information in the second character position of each of the memory words $W_1$ through $W_n$, etc.

The circuitry of memory 1 and the manner in which the contents of the argument registers are transmitted and compared to the contents of the memory, and the manner in which a match between a field in the memory and the argument in the register results in an indication to the match circuits 7 and 8 is in accordance with conventional associative memory operation and will not be described in detail. An associative memory which could be employed in the present system is shown in U.S. application, Serial Number 119,719, filed June 26, 1961 by H. Fleisher and R. I. Roth entitled "Associative Memory" and assigned to the present assignee. The manner in which the memory 1 is interrogated and read-out may be that described in U.S. application, Serial Number 120,213, filed June 28, 1962 by H. Fleisher and R. I. Roth entitled "Associative Memory System" and assigned to the present assignee.

With the arrangement depicted in FIG. 5 it is seen that there can be no match between the field in argument register 2 and the assicoated field in the first data word in memory 1. The next pulse from clock 6, referred to as the C pulse, which normally triggers the match flip-flops in single match register 7 will not do so as a match is not present.

The next two pulses from clock 6, designated as the D and E pulses, when applied to registers 2 and 3 cause shifting of the contents of the registers one character position to the left, as shown in FIG. 6. Clock 6 recycles and $^2$A, $^2$B and $^2$C pulses occur with the same "no match" result as described for the first cycle. The $^2$D and $^2$E pulses again shift the contents of registers 2 and 3 one character position to the left resulting in a condition as shown in FIG. 7.

In FIG. 7, the first field boundary mark is now located in the first character position of register 3. The condition where the field originally entered into register 2 beings to enter register 3 is herein referred to as "spillover." The $^3$A pulse of the next clock cycle will again set memory 1 in the match condition and interrogate the last character position 9 of the intermediate stage of register 2 for the presence of a field boundary mark. With the condition as shown in FIG. 7 there will now be a field boundary mark present in the last character position 9 of the intermediate register. The presence of a field boundary mark in the last character position 9 of the intermediate register changes slightly the mode of operation of the system by means of circuitry to be later described in detail. One variation is that the contents of register 3 rather than register 2 will be read into the memory 1 upon occurence of the $^3$B pulse. The $^3$C pulse, which interrogates memory 1 for a match condition will, with the condition as depicted in FIG. 7, indicate "no match." It is to be noted that only the high-order character of the argument field is contained in register 3 and compared in memory 1. Since no match occurred with the high-order character, it is not necessary to also read in the lower-order characters in register 2 for comparison. Since no match occurred during the $^3$C pulse period, the subsequent $^3$D and $^3$E pulses will shift registers 2 and 3 to produce a storage condition as shown in FIG. 8.

In FIG. 8 it is seen that the 9 character of the field argument is located in the right most character position of register 3. During the next clock cycle the $^4$A pulse resets memory 1 to the match condition and interrogates the last character position 9 of the intermediate register for the presence of a field boundary character. A field boundary character was present in the last character position 9 of the intermediate register in the previous cycle and produced the spillover condition. The spillover condition will remain until a second field boundary mark is stored in the last character position 9 of the intermediate register indicating that the field argument is entirely contained in register 3. The 4B pulse will reset memory 1 to the not match condition and read the content of register 3 into memory 1. The 4C pulse will interrogate memory 1 to determine if a match exists. With the arrangement of FIG. 8 a match will not occur. Note that although the 9 character in the first character position of register 3 associates with the 9 character in the first character position of memory W₃, there is no association between first field boundary mark in the second character position of register 3 and any of the second character positions of the memory words. Thus the 4C pulse indicates a "no match" and the 4D and 4E pulses shift registers 2 and 3 to produce the arrangement shown in FIG. 9.

Clock pulse 5A resets memory 1 to the match condition and pulse 5B reads the contents of register 3 into memory 1. There is now a match between the contents of register 3 and the first three character positions of memory word W₁, therefore all memory words except memory word W₁ switch to the not match condition. Pulse 5C interrogates memory 1 and determines that a match is present in memory word W₁. The match is not for the entire field argument but only for the higher order characters

95 of the field in register 3. This match is stored in single match circuit 7. The lower order characters 2 and

of the argument are still located in register 2 and it is necessary to now associate register 2 with memory 1. The shift pulses 5D and 5E are therefore blocked in order that the character positions of the 2 and

characters are not disturbed.

The 6A pulse of the next clock cycle again resets the memory words to their match position. This does not affect the match indication of single match circuit 7. Circuits 7 and 8 are reset only by a separately conditioned B*r* pulse or as a result of a given condition.

Upon the occurence of the 6B pulse, the contents of register 2 is read into memory 1 for association. A match will occur during the 6C pulse period and the match indication will be entered into consecutive matching circuit 8. A signal from consecutive matching circuit indicates the presence of a memory match and also is employed to stop clock 6 after the 6E pulse and indicates that a memory read-out of the matching word is required.

The reading-out of the memory word can be accomplished as previously stated by the method taught in U.S. application Serial Number 120,213. Such read-out device is designated by reference numeral 8*a* in FIG. 1. The read-out signal occurs at pulse 6C and a stop signal is applied to clock 6. Clock 6 continues to run to pulse 6E, however, since the read-out has occurred, the 6D and 6E shift pulses have no effect on the read-out signal which occurred at pulse 6C. The state of the registers 2 and 3 after the occurence of pulse 6E is shown in FIG. 10.

Clock 6 is started again and the memory 1 will be reset by pulse 7A, the contents of register 3 will be associated with the memory words at pulse 7B, pulse 7C will indicate no match and pulses 7D and 7E will shift the registers 2 and 3 to produce the condition shown in FIG. 11. It is seen by observing the condition shown in FIG. 11 that the second field boundary mark will be contained in the last character position 9 of the intermediate register. This condition is sensed upon the occurrence of clock pulse 8A and results in a circuit condition to stop clock 6 after the occurrence of pulse 8E and indicates that the association with the present field argument is complete. Also, a reset end pulse (RE) is generated to reset the control circuit 4. The system is now in condition to have a new argument entered into register 2 for a new association.

The preceding discussion described the system operation where spillover was necessary before an association was indicated. It is also possible that the field contained in the memory 1 with which association is desired may be contained entirely in one memory word, for example the field

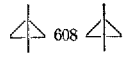

in memory word W₂ in FIG. 6. In such instance the association will occur on the first clock cycle and the spillover feature will not be required. The circuitry of the system is arranged such that an association read-out will be initiated any time a complete single match occurs and spillover has not occurred, but only consecutive matches will produce a read-out after spillover has occurred.

The above discussion related to the mode of operation of the system in general terms. A more specific discussion of the operation of the various circuits employed in the system now follows.

FIG. 2 is a more detailed illustration of clock 6. A conventional clock circuit 10 cyclically generates the five pulses A, B, C, D, E previously discussed. The A pulse appears on lead 11 and is employed to reset the associate circuits of memory 1 (FIG. 1) to their match condition via lead 12 and to interrogate the last character position 9 of the intermediate register (FIG. 1) via lead 13. The B pulse appears on lead 14 and is employed as the read current for reading the contents of registers 2 or 3 into memory 1 via lead 15. The B pulse is also applied as input signals to "AND" circuits 16 and 17 where they are ANDed with a "read select register 3" signal on lead 18 at AND gate 16 and a "before spillover" signal on lead 19 at AND gate 17. The read select register 3 signal on lead 18 and the before spillover signal on lead 19 are obtained from control circuit 5 of FIG. 1 to be later discussed. The outputs of AND circuits 16 and 17 are applied to OR circuit 20 which generates a B*r* pulse on lead 21 which is used to reset flip-flops in single match circuit 7, consecutive match circuit 8 and control circuit 5 (FIG. 1). Thus, the only time a B*r* pulse is not produced is when an after spillover condition is present, argument register 3 has been associated, and the contents of argument register 2 is being read into memory 1. The B*r* pulse is undesired at such condition because resetting the flip-flops would wipe-out the match condition obtained from the contents of argument register 3.

The C pulse appears on lead 22 (FIG. 2) and is applied to single match circuit 7 (FIG. 1) to test for a match condition. The D pulse appears on lead 23 and is applied to AND circuits 24 and 25, the outputs of which are applied to OR circuit 26. The output signal from OR circuit 26 is applied to argument registers 2 and 3 via lead 27 to shift the contents of the registers into their intermediate registers. The E pulse appears on lead 28 and is applied to AND circuits 29 and 30, the outputs of which are applied to OR circuit 31. The output signal from OR circuit 31 is applied to registers 2 and 3 via lead 32 to shift the contents of the intermediate registers into the main registers. AND circuits 24 and 29 are gated by the read select register 2 pulse or lead 33 from control circuit 5 (FIG. 1), AND circuits 25 and 30 are gated by the presence of both the read select register 3 signal on lead 18 and a not match signal on lead 34 from control circuit 5 (FIG. 1). This ensures that shifting will occur when either register 2 or register 3 is read-out and not match occurs. There is one time when shifting is not desired. This is when a match has occurred after spillover with the contents of register 3. It is then necessary to read the contents of register 2 into memory 1 without a previous shift. For this condition there will be a read select register 3 signal on lead 18, but no signal on leads 33 and 34.

By observation of AND circuits 24, 25, 29 and 30 it is seen that the D and E pulses are blocked for such conditions and shifting will not take place.

Two input leads 35 and 36 are provided to start and stop clock circuit 10 respectively. The stop lead 36 is coupled from consecutive match circuit 8 (FIG. 1) so that when a match occurs, clock circuit 10 can be stopped after the E pulse to permit a memory read-out of the matching word. The start lead 35 is connected to the memory read-out circuit so that a pulse therefrom may restart the clock circuit 10 when it is ascertained that no further matches exist for the particular shift of registers 2 and 3. It was stated that the memory read-out circuit in the present disclosure may be, for example, that shown in U.S. application, Serial Number 120,213. If such read-out circuit were employed, lead 35 of FIG. 5 would be connected to lead 240, FIG. 2b, sheet 3 of the cited reference.

Referring to FIG. 3, the control circuit 5 of FIG. 1 is shown in greater detail. Initially, the various flip-flops are reset prior to the association. Thus, flip-flop 37 is reset to provide a signal on before spillover lead 19 and a "no signal" condition at the input of AND gate 43 (which is connected to the A pulse lead 13 of clock circuit 10 in FIG. 2). Flip-flop 38 is reset to place a "no signal" condition at the input of AND circuit 39, flip-flop 40 is reset to provide a no signal condition at the input of AND circuit 41, and binary flip-flop 42 is reset to provide signal on read select register 2 lead 33 (which along with leads 18, 19 and 36 are coupled as input leads to clock 10 in FIG. 2).

Control circuit 5 of FIG. 3 is now arranged to provide the necessary signals for the initial associations, that is, before spillover when only the contents of argument register 2 are being associated. During the before spillover clock cycles, the A pulses from clock circuit 10 (FIG. 2) are applied as input signals on lead 13 and B pulses are applied as input signals on lead 15. Prior to spillover the A and B pulses will not pass through AND gates 43 and 46 since the other inputs to the gates have no signal thereon.

On the clock cycle following spillover the A pulse is applied to the last character position 9 of the intermediate stage of argument register 2 (FIG. 1). The presence of the first field boundary mark in the last character position 9 produces a spillover indicating signal referred to as "$As.o.$" The A pulse on lead 13 (FIG. 3) is of sufficient duration such that it is still present at gate 43 when the $As.o.$ signal is applied through lead 47 to switch flip-flop 37, which in turn gates the A signal through AND gate 43. The output signal from AND gate 43 is also gated through AND gate 48 because, although there is no signal from AND gate 49, inverter 50 causes a signal to be applied to AND gate 48. The output signal from AND gate 48 triggers flip-flop 42 to provide a signal on read select register 3 lead 18. This is to enable register 3 to be read before register 2 after spillover has occurred. Note also that the switching of flip-flop 37 has applied a signal on after spillover lead 51 and removed the signal from before spillover lead 19.

When the B pulse is present on input lead 15 it will be gated through AND gate 46 since a signal is now present from flip-flop 42. The output from AND gate 46 will switch flip-flop 38 which places a signal at the input of AND circuit 39. AND circuit 39 is now in condition to be gated upon the next occurrence of an $As.o.$ signal (from AND circuit 52). The next $As.o.$ pulse during a read select register 3 cycle will indicate the entire field has entered argument register 3 and that the association should be ended. Thus, the next $As.o.$ pulse during read select register 3 will be gated through AND circuit 52 and AND circuit 39 to switch flop-flop 40. Flip-flop 40 conditions AND circuit 41 such that the E pulse on lead 32 from FIG. 2, occurring after the aforementioned $As.o.$ pulse will be gated through AND circuit 41 to transmit a stop pulse via lead 36 to clock circuit 10 of FIG. 2. AND circuit 52 insures that a stop pulse can be produced on lead 36 only during the end of a read select register 3 cycle.

Delay element 45 is connected to the input of AND gate 52 to eliminate any error that may occur immediately after spillover, that is, when the first field mark of the argument is in the first character position of register 3. When the first field mark is in the first character position of register 3, it will also be located in the last character position 9 of the intermediate register.

If the $As.o.$ pulse on lead 47 is applied to AND gate 52 before the A pulse on lead 13 passes through AND gates 43 and 48 to switch flip-flop 42 in order to remove the signal from lead 18, an erroneous signal may be passed through AND gate 52 which ultimately results in a stop signal being produced on line 36 during the E pulse. To overcome this possibility, the delay element 45 is provided.

Flip-flop 54 is provided to permit argument register 2 to be read directly after argument register 3 when a match occurs. The Br pulse on lead 21 from the clock circuit in FIG. 2 normally provides a not match condition on flip-flop 54. This is, a signal will be present on lead 55 and AND gate 49 will be in a condition to be gated. Note that with AND gate in condition whenever a read select register 3 signal is present, an output signal from gate 49 will be present and will be inverted by inverter 50 to prevent AND gate 48 from allowing any A pulses from AND gate 43 through to switch flip-flop 42. Thus, argument register 3 will continue to be read at each clock cycle after spillover as long as no match has occurred. When a match occurs, it is then desired to read argument register 2. Therefore, a match signal on lead 53 from consecutive match circuit 8 (FIG. 1) causes flip-flop 54 to switch and removes the no match signal from leads 55 and 34. The absence of a no match signal on lead 34 was previously discussed in relation to FIG. 2. The removal of the no match signal on lead 55 turns AND gate 49 "off" and the output signal from AND gate 49 is removed. This causes a signal at the output of inverter 50 which gates the next A pulse on lead 44 through to flip-flop 42 so that a read select register 2 signal will be produced and the contents of argument register 2 will be associated in the memory. Note that this occurs only after spillover when a match of the contents of argument register 3 has been indicated.

FIG. 4 is a detailed illustration of the circuitry included in the single match circuit 7 and consecutive match circuit 8 of FIG. 1. In FIG. 4 the input leads 60–1, 60–2 . . . 60–(n−1), 60–n are the output leads from memory 1 (FIG. 1) which are associated with memory words $W_1, W_2 \ldots W_n$. A signal on any one of leads 60–1 through 60–n indicates that a match has occurred between the contents of the argument registers and the contents of the associated memory word. Leads 60–1 through 60–n are connected to the inputs of groups of AND gates. Lead 33 which conducts the read select register 2 signal, lead 18 which conducts the read select register 3 signal and lead 19 which conducts the before spillover signal (leads 33, 18 and 19 appearing in FIG. 3) are connected to particular AND circuits within the groups.

The two possible ways in which a complete match may occur are first, an entire field in a single memory word may match with the argument in register 2 (FIG. 1) before spillover, and second, the higher order characters of the argument in register 3 may match with a part of a field in one memory word after spillover which may be followed by the lower order characters in register 2 matching with the remainder of the field in the memory word beneath the memory word having the higher order characters.

Consider the first case with reference to FIG. 4. Presume that a field entirely within memory word $W_2$ matches with the argument in register 2 before spillover.

In FIG. 4 there will be a signal on lead 60–2 which is applied to AND gates 63, 64 and 65. Since spillover has not occurred, there will be a before spillover signal on lead 19 and since register 2 is being associated, there will be a read select register 2 signal on lead 33 so that AND gate 64 will be gated applying a signal through OR gate 72 to place AND gate 76 in gating condition. Upon the occurrence of the C pulse from clock 10 (FIG. 2) on lead 22, a signal will pass through AND gate 76 and trigger flip-flop 82 to place a signal on lead 86. It is noted that flip-flops 81, 82, 83 and 84 were previously conditioned by the Br pulse on lead 21 from clock 10 (FIG. 2) such that no signal was present on leads 85, 86, 88 and 90.

The signal now on lead 86 is applied to OR circuit 92 of consecutive match circuit 8. The output signal from OR circuit 92 is applied to flip-flop 54 (FIG. 2) via lead 53 as previously described and to AND circuit 93 where it is gated by the before spillover signal on lead 19 (from FIG. 2) and conducted through OR gate 94 to be applied as a stop pulse to clock 10 (FIG. 2) via lead 36. The signal on lead 36 is also applied to the read out circuit 8a to indicate a complete match.

The circuit operation described above with respect to a complete word match in memory word $W_2$ will be the same if a complete word match occurs in any of the other memory words thereby placing a signal on any one of the other input leads 60–1 through 60–n.

When there is a match between the higher order argument characters in register 3 and part of a field in a memory word after spillover there will be a match signal from the appropriate memory word, for example on lead 60–2. Since spillover has occurred, there will be a read select register 3 signal on lead 18 but no signal on lead 33 or 19. The signals on leads 60–2 and 18 will gate AND circuit 65 thereby applying a signal on AND circuit 76 through OR circuit 72. Upon the occurrence of the C pulse an output signal from AND circuit 76 will trigger flip-flop 82 causing a signal to be present on lead 86. The signal on lead 86 will pass through OR gate 92 to AND circuit 93. AND circuit 93 will not be gated however, since there is no before spillover signal on lead 19. Thus no signal will be passed through OR gate 94 to stop the clock. On the other hand, the output signal from AND circuit 92 will be conducted on lead 53 to flip-flop 53 (FIG. 3) so that a read select register 2 signal will occur on the next A pulse to enable the lower order characters in register 2 to be compared since a match has occurred with the higher order characters in register 3. The lower order characters in register 2 will match, if at all, with the characters in the next adjacent memory word to the memory word which matched the higher order characters in register 3. This is obvious since if a field in memory is split, it must be apportioned in adjacent memory words. Referring to FIG. 4, it is necessary to condition the circuit so that a next match will only be valid if occurring in the next adjacent memory word. This is accomplished by the signal (in the example) on lead 86. The signal on lead 86, in addition to being applied to OR gate 92, is also fed to AND circuit 66, which, in the present example, is associated with the next adjacent memory word $W_{n-1}$. If a match is present between characters in memory word $W_{n-1}$ and the lower order characters in register 2 of the field argument a signal will be present on lead 60–(n–1) which will be applied to AND circuits 66, 67 and 68. Since register 2 has been read after spillover a signal will be present on lead 33 and not on leads 18 and 19. Thus AND circuit 66 will be gated by the signals on leads 60–(n–1), 33 and the signal from flip-flop 82 on lead 86.

When the C pulse occurs, AND circuit 77 will be gated which produces a signal which triggers flip-flop 96. Note: flip-flops 95, 96 and 97 normally provide no output signals, being conditioned by the Br pulse on lead 21. Flip-flop 96, now being triggered, applies a signal to OR gate 98 which in turn gates AND circuit 99. Since spillover has occurred, an after spillover signal will be present on lead 51 into AND gate 99 which in turn produce an output signal through OR circuit 36 to indicate a complete match has occurred and to provide a stop signal to the clock.

The examples just discussed describe the operation of the circuit of FIG. 4 when a complete match occurred between memory word $W_2$ and argument register 2 before spillover and when a complete match occurred between memory words $W_2$ and $W_{n-1}$ and registers 2 and 3 with spillover. It can be seen that similar results will be obtained were the same conditions to occur with another memory word or adjacent memory words.

When no match occurs in memory 1, there will be no signals present on any of the input leads 60–1 through 60–n and the circuit of FIG. 4 will not operate. If a single match occurs with the higher order argument characters in register 3 after spillover, the circuit of FIG. 4 will operate as previously described, i.e. a match will be indicated and the output signal on lead 53 will produce a read select register 2 signal in the circuit of FIG. 3. If there is no consecutive match with the lower order characters in register 2, i.e. no complete match, there will be no match signal from the adjacent memory word and no input signal on the adjacent input lead, thus no match indication signal will be produced on output lead 36 and the clock will continue to run and shift the registers for a new association.

Having located the desired field in the memory, the entire data word containing the field is read-out. The data word may be read-out by means of conventional circuits since it is known that the data word is bounded by a "beginning of word" mark on one side of the field and an "end of word" mark on the other side of the field.

What has been described is a novel associative memory system wherein variable length data words may be associated and wherein fields within the data words may occupy character positions in more than one memory word. It is to be understood that the principles of the present invention may be applied to a wide variety of memory systems including cryogenic, magnetic core, etc. In the described example, the fields being associated were shown to be located in two memory words and therefore only one spillover register 3 was shown. If however, in a particular operation the fields being associated may be of such length as to be located in three or more memory words, then two or more spillover registers are required in addition to the first register. The general rule of design is that the total number of memory words in which a field may be located must equal the total number of registers.

While the invention has been particularly shown and described with reference to a preferred embodiment thereof, it will be understood by those skilled in the art that various changes in form and details may be made therein without departing from the spirit and scope of the invention.

What is claimed is:

1. A fully associative memory system comprising in combination:
   a memory storage means having a plurality of digital character storage elements arranged in equal length adjacent memory words for storing data words of variable length wherein given ones of said data words may be distributed in more than one memory word,
   a first association input register coupled to said memory storage including a plurality of digital character storage elements arranged in a row of length equal to said memory words wherein an argument word is sequentially shifted therethrough for comparison with the contents of said memory for selecting a data word associated with said argument word,
   and means including at least one supplementary association input register for receiving argument words sequentially shifted from said first register for further comparison when said data word associated with said argument word is distributed in more than one memory word.

2. A fully associative memory system comprising in combination:
- a memory storage means having a plurality of digital character storage elements arranged in equal length adjacent memory words for storing data words of variable length wherein given ones of said data words may be distributed in more than one memory word,
- a first association input register coupled to said memory storage including a plurality of digital character storage elements arranged in a row of length equal to said memory words wherein an argument word composed of a predetermined number of digital characters is sequentially shifted therethrough for comparison with the contents of said memory for selecting a data word associated with said argument word when said data word is distributed in a single memory word,
- and further association means including at least one suplementary association input register including a plurality of digital character storage elements arranged in a row of length equal to said memory words for receiving said arguments word shifted from said first association register for further comparison with the contents of said memory when said data word associated with said argument word is distributed in more than one memory word.

3. A fully associative memory system according to claim 2 further including a control means coupled to said memory storage, said first association register and said further association means for conveying the contents of said first association register and said further association means to said memory for comparison and for controlling the shifting of said argument word from said first associative register to said at least one supplementary register.

4. A fully associative memory system according to claim 3 wherein said control means conveys said argument word to said memory means for said comparison and shifts each digital character of said argument word one element position of said first association register when no comparison occurs and for shifting each digital character of said argument word sequentially into said one supplementary association register after each said digital character has been shifted through all of said element positions of said first association register without a comparison occurring.

5. A fully associative memory system according to claim 4 wherein said control means further includes means, operative after at least one of said digital characters of said argument word has entered said one supplementary association register, for comparing the contents of the digital characters of said first association register with the contents of said memory storage and for comparing the digital characters of said one supplementary association register with the contents of said memory storage means when a comparison has occurred with the digital characters of said first association register.

6. A fully associative memory system for variable length data words comprising in combination:
- memory storage means having a plurality of digital character storage elements arranged in rows and columns for forming data words in said rows wherein given ones of said data words may be distributed in more than one row,
- association means including a plurality of argument registers, each register having a plurality of digital character storage elements arranged in a row having a length equal to the length of the rows in said memory storage and each element of said registers connected to corresponding elements in separate ones of said columns of said memory storage,
- means for introducing an argument word composed of digital characters in given elements of one of said plurality of registers for comparison with the contents of said memory storage for association with a corresponding data word,
- and means for sequentially transferring said digital characters of said argument word into the other ones of said plurality of registers for further association when the associated data word is located in more than one row.

No references cited.

ROBERT C. BAILEY, *Primary Examiner.*

P. J. HENON, *Assistant Examiner.*